(No Model.)
C. M. P. LAFIT.
COCK AND TAP.
No. 334,787. Patented Jan. 26, 1886.
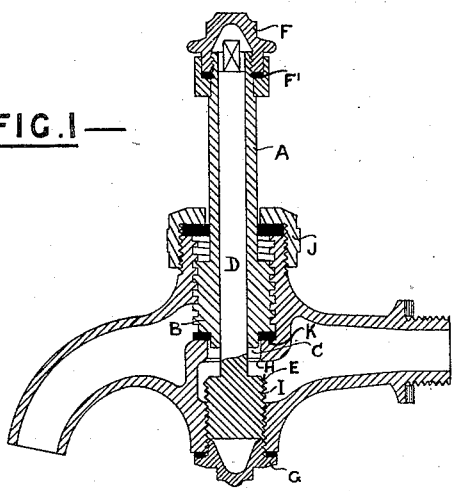
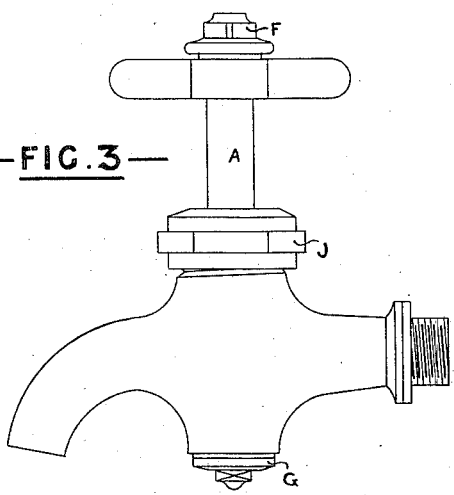
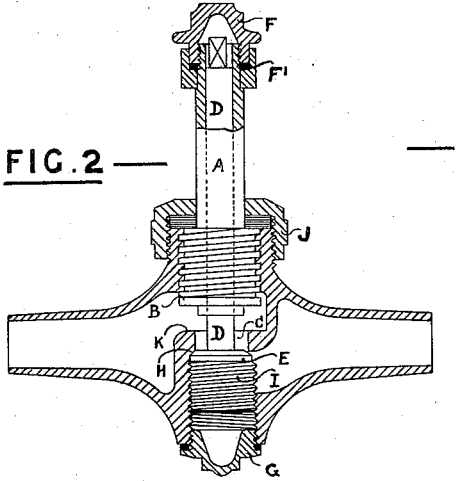
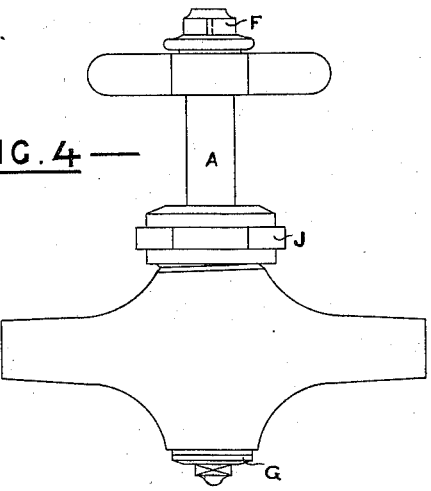
WITNESSES
Stephen Edward Runyon
115 Cannon Street, London.
William Anderson Smith
23 Farleigh Road, London N.
INVENTOR
C. M. P. Lafit
by his Attorney
M. E. Beck

UNITED STATES PATENT OFFICE.

CARLOS MANUEL PAULINO LAFIT, OF BRIGHTON, COUNTY OF SUSSEX, ENGLAND.

COCK AND TAP.

SPECIFICATION forming part of Letters Patent No. 334,787, dated January 26, 1886.

Application filed January 23, 1885. Serial No. 153,806. (No model.) Patented in England May 28, 1884, No. 8,342, and in France November 17, 1884, No. 165,423.

*To all whom it may concern:*

Be it known that I, CARLOS MANUEL PAULINO LAFIT, a subject of the King of Spain, residing at Brighton, in the county of Sussex and Kingdom of Great Britain, have invented certain new and useful Improvements in Cocks and Taps, (for which Letters Patent have been granted in Great Britain, bearing date May 28, 1884, No. 8,342, and in France bearing date November 17, 1884, No. 165,423;) and I do hereby declare that the following is a full, clear, and exact description of the invention, which will enable others skilled in the art to which it appertains to make and use the same.

My improvements refer to the arrangement and construction of taps and cocks provided with an additional or supplementary stop-valve for the purpose of shutting off the supply of water from the main valve when desired, in order to avoid the necessity of turning off the supply from the main when repairs to the valve or its seating are required.

In the specification of an English Patent granted to H. Beach, No. 2,994, A. D. 1875, the application of a valve to the lower part of high-pressure taps is described. The said valve is fitted to a screw-spindle working through a stuffing-box on the under side of the tap in such a manner that the valve can be raised or lowered, as required. In this arrangement much inconvenience is experienced in getting at the stem or spindle of the supplementary valve for the purpose of closing or opening it when required.

According to my present invention the inconvenience above mentioned is entirely obviated, and the spindle of the supplementary stop-valve is so situated as to be readily accessible, and the expense of manufacture is greatly modified, as the extra stuffing-box for the supplementary valve is in my arrangement dispensed with.

In the accompanying drawings, Figures 1 and 2 are respectively longitudinal sectional elevations of a bib-cock and stop-cock with my invention applied thereto; and Figs. 3 and 4, corresponding side elevations of the same, in which—

A is the stem or spindle of the main screw plug or valve B, which spindle passes through a screwed cap, J, in the usual manner.

C is the outlet-orifice; D, the stem or spindle of a supplementary valve, E, which is furnished with a screwed part, I, as shown.

F is a cap covering the top of the spindle D, and G is a screwed plug for closing the opening at the bottom of the tap.

H and K are respectively the seatings for the valves B and E.

Similar letters relate to like parts in all of the figures.

The stem or spindle A of the main screw plug or valve B, for opening and closing the passage C, is made hollow—that is to say, is perforated axially from end to end—and in this hollow stem or spindle A is inserted the stem D of the supplementary screw stop-valve E, which is screwed into the body of the tap beneath the main valve B. The stem D of this supplementary plug or valve E is made square at the top, or of other suitable shape adapted to receive a key or other instrument by which the said stem D, with its valve E, can be turned round. The stem D is preferably made of such a length that it projects above the top of the before-mentioned hollow spindle A, which is fitted with a screwed cap, F, covering the top of the inner spindle or stem, D, and making a tight joint, by means of the elastic washer F', with the upper part of the spindle A, so as to prevent leakage. The opening at the bottom of the tap, through which the supplementary valve E is inserted, is also closed with a screwed plug, G, to prevent leakage. When it is desired to remove the main valve B for any purpose, the aforesaid cap F is unscrewed, and the stem D is turned round with a key or other suitable instrument applied to the head or top thereof. This causes the stop-valve E to be drawn to its seating H by means of the screw-thread I, and the passage C, through the tap or cock, is thereby closed. The cap J may then be removed and the main valve B, with its hollow spindle, withdrawn, and any required repairs to it or to its seat K effected.

Taps or cocks constructed in accordance with my invention are especially advantageous for use on water-main pipes, as a great saving of water and plumber's time in repairing is thereby effected. They are also applicable for other liquids besides water and for steam, gas, or air. The supplementary stop-valve may also be used for regulating the supply to the main valve, as by closing the supplementary valve more or less the supply can be reduced to any required limit however much the main valve is opened.

I claim—

In a cock, tap, or faucet, the combination of a main valve having a hollow spindle projecting through the said cock, tap, or faucet, with a stop-valve located below the main valve and provided with a spindle or stem extending through the spindle of the main valve, and screw-caps for securing the parts together, substantially as set forth.

CARLOS MANUEL PAULINO LAFIT.

Witnesses:
W. K. CARGILL,
GEO. COLEMAN,
Both of 63 Ship Street, Brighton, England, Clerks to Mr. Edwin Boxall, of Brighton, Solicitor and Notary Public.